United States Patent [19]

Schroeder et al.

[11] Patent Number: 5,274,697

[45] Date of Patent: Dec. 28, 1993

[54] AUTOMATIC DATA RESTORAL FOR MODEMS

[75] Inventors: Stephen Schroeder, Stoughton; Manickam R. Sridhar, Norton, both of Mass.

[73] Assignee: Codex Corporation, Mansfield, Mass.

[21] Appl. No.: 20,897

[22] Filed: Feb. 22, 1993

Related U.S. Application Data

[63] Continuation of Ser. No. 826,204, Jan. 22, 1992, abandoned, which is a continuation of Ser. No. 460,780, Jan. 4, 1990, abandoned.

[51] Int. Cl.⁵ ............................................. H04M 11/00
[52] U.S. Cl. ..................................... 379/98; 370/16; 371/8.2; 371/11.2
[58] Field of Search ............... 379/98, 97, 93, 220, 379/221, 209, 40; 370/16; 371/8.1, 8.2, 11.1, 11.2; 375/8, 10

[56] References Cited

U.S. PATENT DOCUMENTS

| | | | |
|---|---|---|---|
| 4,076,961 | 2/1978 | Holsinger et al. | 379/2 |
| 4,716,582 | 12/1987 | Blanchard et al. | 379/40 |
| 4,910,763 | 3/1990 | Caron et al. | 379/98 |
| 5,010,550 | 4/1991 | Hirata | 371/8.2 |
| 5,048,054 | 9/1991 | Eyuboglu et al. | 375/8 |
| 5,138,609 | 8/1992 | Hashimoto | 370/16 |

Primary Examiner—Jin F. Ng
Assistant Examiner—Stella L. Woo
Attorney, Agent, or Firm—Darleen J. Stockley

[57] ABSTRACT

Automatically restoring data transmission by monitoring line degradation and switching to a new line (or lines) when line quality falls below a prescribed standard. Data transmission is maintained on the leased line while communication is being established on the dial line, so as not to disrupt data transmission; communication is established across two dial lines to restore full-duplex transmission; energy is maintained on the dial lines at times when data is not being transmitted to prevent a change of channel on a dial line; a signal processor, associated memory, and analog interface circuitry provide the data restoral functions; control of the restoral procedure is handled by one modem (e.g., the calling modem), and commands are sent to the other modem over either the leased or dial lines.

38 Claims, 4 Drawing Sheets

AUTOMATIC DATA RESTORAL FOR MODEMS

This is a continuation of application Ser. No. 07/826,204, filed Jan. 22, 1992 and now abandoned which is a continuation of application Ser. No. 07/460,780, filed Jan. 4, 1990 and now abandoned.

BACKGROUND OF THE INVENTION

This invention relates to restoral of data transmission between modems by switching transmission from a degraded line to a functioning line.

Modems often transmit data over leased lines, particularly when transmission is at high bit rates. When such lines fail or degrade, it is known to provide an alarm indication, and to provide the operator with a means for manually switching transmission, temporarily, from the leased line to a dial line (i.e., a Public Switched Telephone Network, or PSTN, line). Some modems have had the capability of automatically switching to a dial line upon loss of the data carrier on the leased lines.

SUMMARY OF THE INVENTION

In a first aspect, the invention features automatically restoring data transmission by monitoring line degradation and switching to a new line (or lines) when line quality falls below a prescribed standard. In preferred embodiments, data transmission is maintained on the leased line while communication is being established on the dial line, so as not to disrupt data transmission; communication is established across two dial lines to restore full-duplex transmission; energy is maintained on the dial lines at times when data is not being transmitted to prevent a change of channel on a dial line; a signal processor, associated memory, and analog interface circuitry provide the data restoral functions; control of the restoral procedure is handled by one modem (e.g., the calling modem), and commands are sent to the other modem over either the leased or dial lines.

In a second aspect, the invention features qualifying the dial lines before switching over by determining whether the quality of the dial lines meets a prescribed standard. In preferred embodiments, dial lines not qualifying are dropped and replaced with new dial lines.

In a third aspect, the invention features automatically switching back to the leased lines by evaluating the quality of the leased lines (e.g., by repeatedly performing calibration of the lines) and initiating switchback if the quality meets a prescribed standard. In preferred embodiments, the dial line connections are maintained (by supplying energy to the lines) for a prescribed period, in order to have the lines available in the event that degradation of the leased line reoccurs.

Other advantages and features will become apparent from the following description of the preferred embodiment and from the claims.

DESCRIPTION OF THE PREFERRED EMBODIMENT

Figure 1:
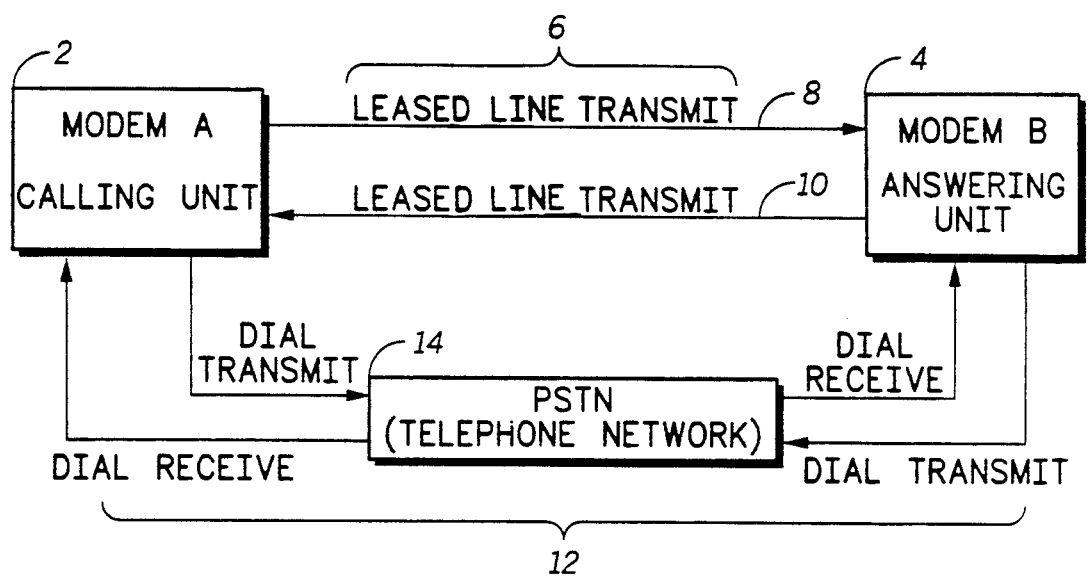
FIG. 1 is a block diagram of a typical modem installation for carrying out automatic data restoral.

Referring to FIG. 1, a calling unit or modem 2 initially establishes data communication with an answering unit or modem 4 over a leased connection 6, which may consist of one or two lines depending upon the modulation mode selected for data communications. If a two-line connection is called for, calling unit 2 transmits data to answering unit 4 over a transmit leased line 8 and receives communications from answering unit 4 over a receive leased line 10. If single line connection is called for, then calling unit 2 and answering unit 4 both transmit and receive data over leased line 8.

Both calling unit 2 and answering unit 4 are equipped to detect when the quality of either one or both of leased lines 8 and 10 have degraded sufficiently to impair data communications. When such line degradation has been detected, calling unit 2 restores reliable data communication by establishing a dial connection 12 with answering unit 4 through the public switch telephone network (PSTN) 14. After dial connection 12 has been established, calling unit 2 then causes data communications to be switched onto dial connection 12 until such time as the quality of leased connection 6 returns to a level capable of reliable data transmission. Depending upon the modulation mode selected for communication over dial connection 6, either one or two dial lines may be used. Once calling unit 2 determines that the quality of leased connection 6 has returned to an acceptable level, it causes subsequent data communications both to and from answering unit 4 to be switched back onto leased connection 6.

Both calling unit 2 and answering unit 4 include the same internal circuitry. Thus it should be understood that the following description, except where explicitly noted, applies to both units 2 and 4.

Figure 2:
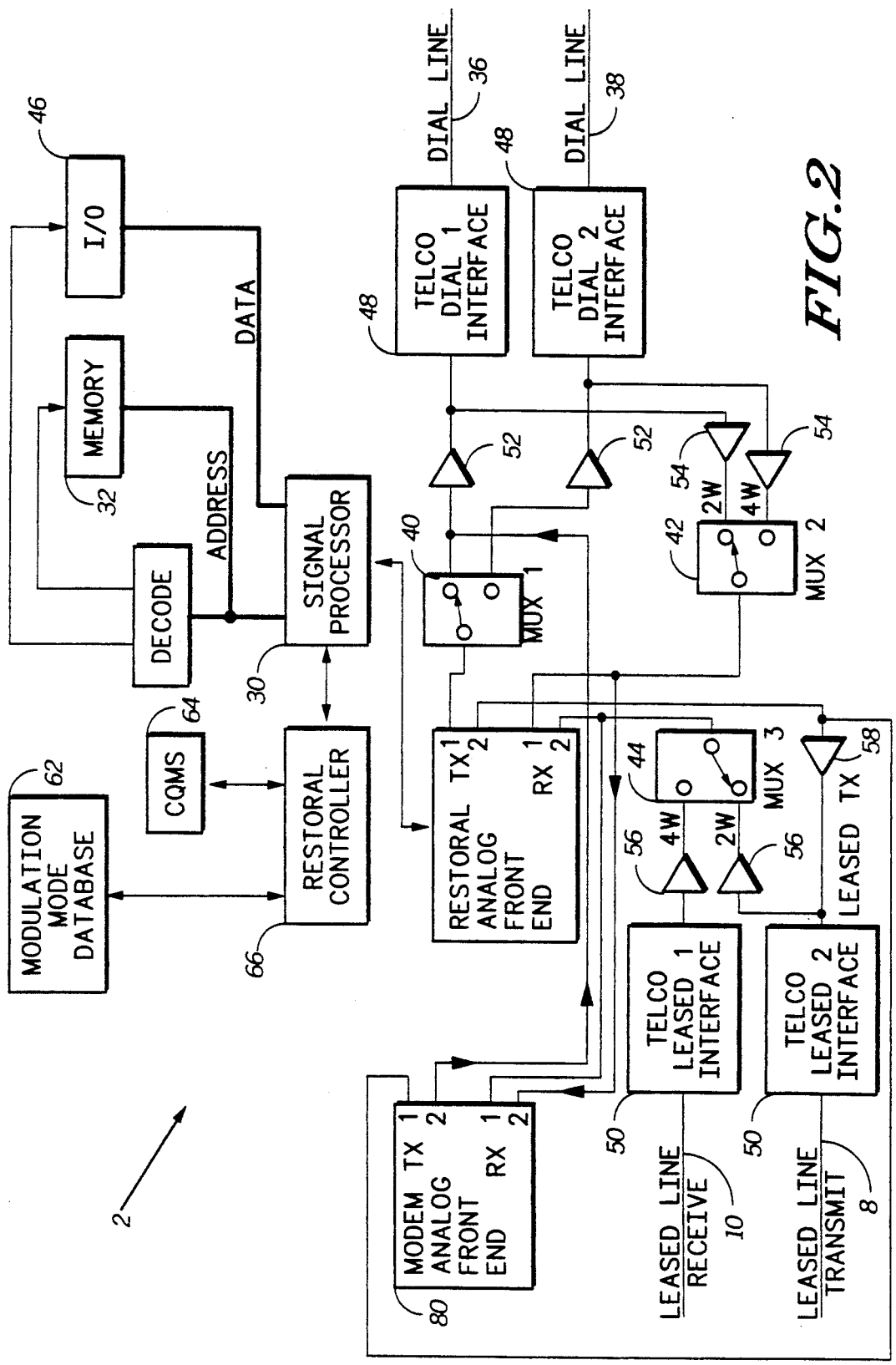
FIG. 2 is a block diagram of the calling unit and the answering unit shown in FIG. 1.

As shown in FIG. 2, calling unit 2 includes a signal processor 30 and associated memory 32 for performing all calling, dial line qualification, and leased line testing performed by the modem. Connected to signal processor 30 is a restoral analog front end 34 which includes two output lines, designated TX1 and TX2, and two input lines, designated RX1 and RX2. Restoral analog front end 34 converts digital signals from signal processor 30 into analog signals that are made available over the appropriate one of its two output lines, TX1 and TX2, and it converts analog signals received at over its input lines, RX1 and RX2, into digital signals that are sent to signal processor 30.

On the output side of analog front end 34, output line TX1 carries signals that are to be sent out over one of two dial lines, namely, dial line 36 or dial line 38, and output line TX2 carries signals which are to be sent out over transmit leased line 8. A multiplexer 40 selects which of the two dial lines 36 or 38 receives the signal on output line TX1. On the input side of analog front end 34, input line RX1 carries signals that are received at the modem over one of the two dial lines 36 or 38, and input line RX2 carries signals that are received at the modem over either transmit leased line 8 or receive leased line 10, depending upon whether the selected modulation mode is either single line or two line, respectively.

Calling unit 2 also includes a modem analog front end 80 which handles all actual data communications to and from the modem. Modem analog front end 80 also includes two output lines, designated TX1 and TX2, and two input lines, designated RX1 and RX2.

On the output side of modem analog front end 80, output line TX; carries signals that are to be sent out over leased line 8; whereas, output line TX2 carries signals that are to be sent out over dial line 36. On the input side of modem analog front end 80, input line RX1 carries signals that are received at the modem over either transmit leased line 8 or receive leased line 10, depending upon whether the selected modulation mode is either single line or two line, respectively, and input line RX2 carries signals that are received at the modem over one of the two dial lines 36 or 38.

A multiplexer 42 selects which of the two dial lines 36 or 38 supply the signal to input line RX1 of analog front end 34 and to input line RX2 of modem analog front end 80. And a multiplexer 44 selects which of the two leased lines 8 or 10 supply the signal to input line RX2 of analog modem 34 and to input line RX1 of modem analog front end 80. Multiplexers 40, 42 and 44 are, in turn, controlled by an input/output (I/O) module 46 which responds to commands from signal processor 30 controls.

Calling unit 2 interfaces with each of dial lines 36 and 38 through a corresponding standard dial line interface circuit 48 and it interfaces with each of leased lines 8 and 10 through a corresponding standard leased line interface circuit 50. Conventional amplifiers 52 and 58 amplify the communication signals before they pass to interface circuits 48 and 50 for transmission over their respective lines. And, 2-to-4 wire converters 54 and 56 (also referred to as hybrids) process the communication signals that are received through interface circuits 48 and 50.

Within calling unit 2 there as a modulation mode database 62 containing all modulation mode characteristics for all modulation modes available in the modem. Thus, unique modulation modes can be selected for leased and for dial operation.

Control of the restoral features of calling unit primarily resides in a circuit quality monitoring system (CQMS) 64 and a restoral controller 66. CQMS 64 monitors the quality of the modem's transmission facilities (which may be either leased connection 6 or dial connection 12 depending upon which connection was selected for data transmissions) to determine whether a resynchronization or retraining of the modem line is required. CQMS 64 may employ any one or more of a variety of line quality measuring techniques to evaluate the quality of the line and decide whether to call for a retraining of the line. For example, among such techniques which may be employed by CQMS 64 are those described in U.S. Pat. No. 4,756,007 to Qureshi et al. dated Jul. 5, 1988 and in U.S. patent application Ser. No. 07/279,370, filed by M. Sridhar et al. on Dec. 2, 1988, both of which are incorporated herein by reference.

CQMS 64 also generates status information about the data transmission facilities such as whether data carrier is present on the line and the number of synchronization sequences (i.e., retrains) which have been transmitted and received during the past fifteen minutes. In the case of data communications over leased lines 8 or 10, when CQMS 64 detects that the leased line carrier has been lost for at least fifteen seconds or that 10 retrain sequences have been received within the last fifteen minutes, it causes restoral controller 66 in calling unit 2 to initiate a restoral backup of the leased line(s), i.e., it causes a dial line connection to be established.

Figure 3:
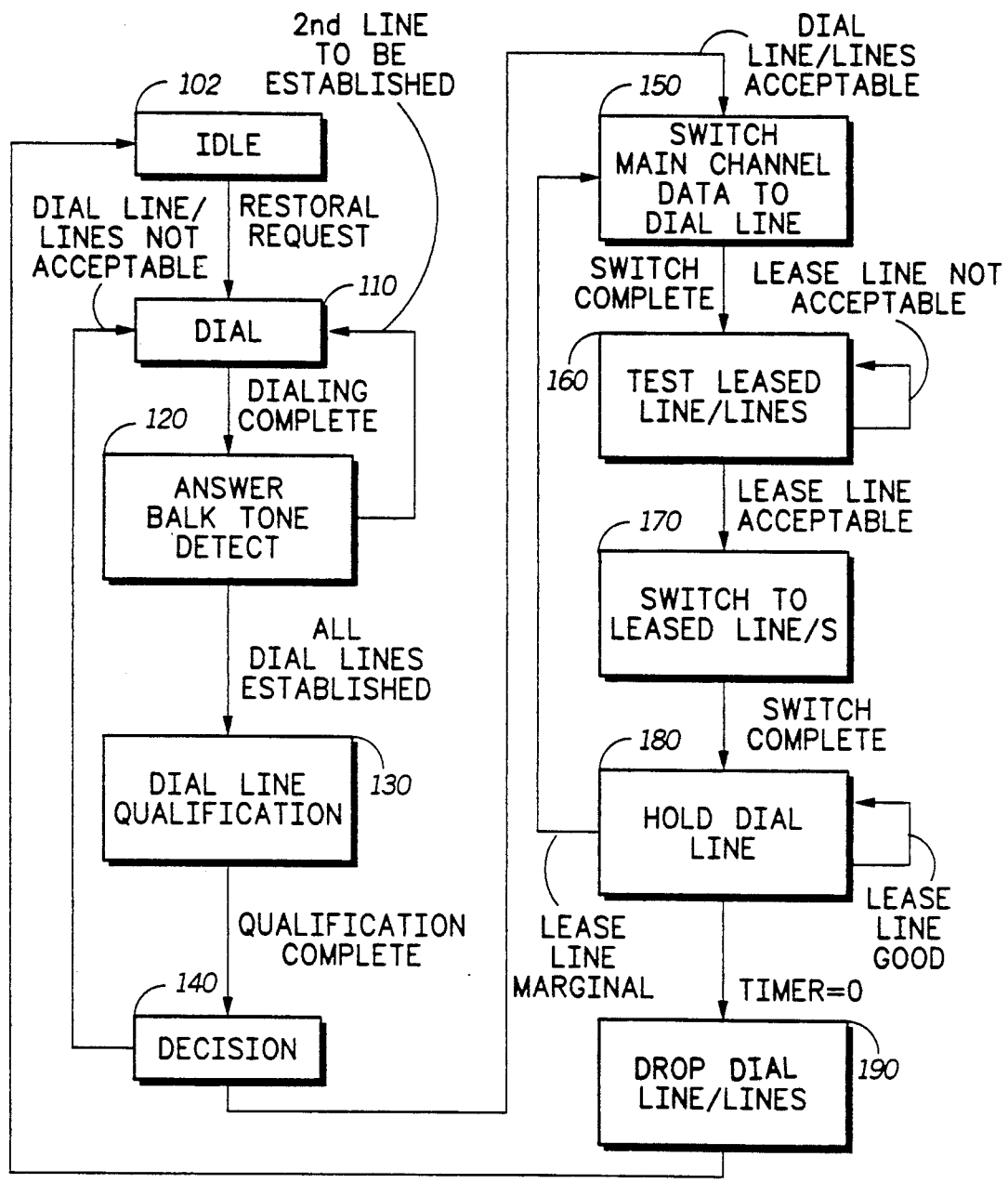
FIG. 3 is a flow chart of the restoral procedure implemented by the calling unit.
Figure 4:
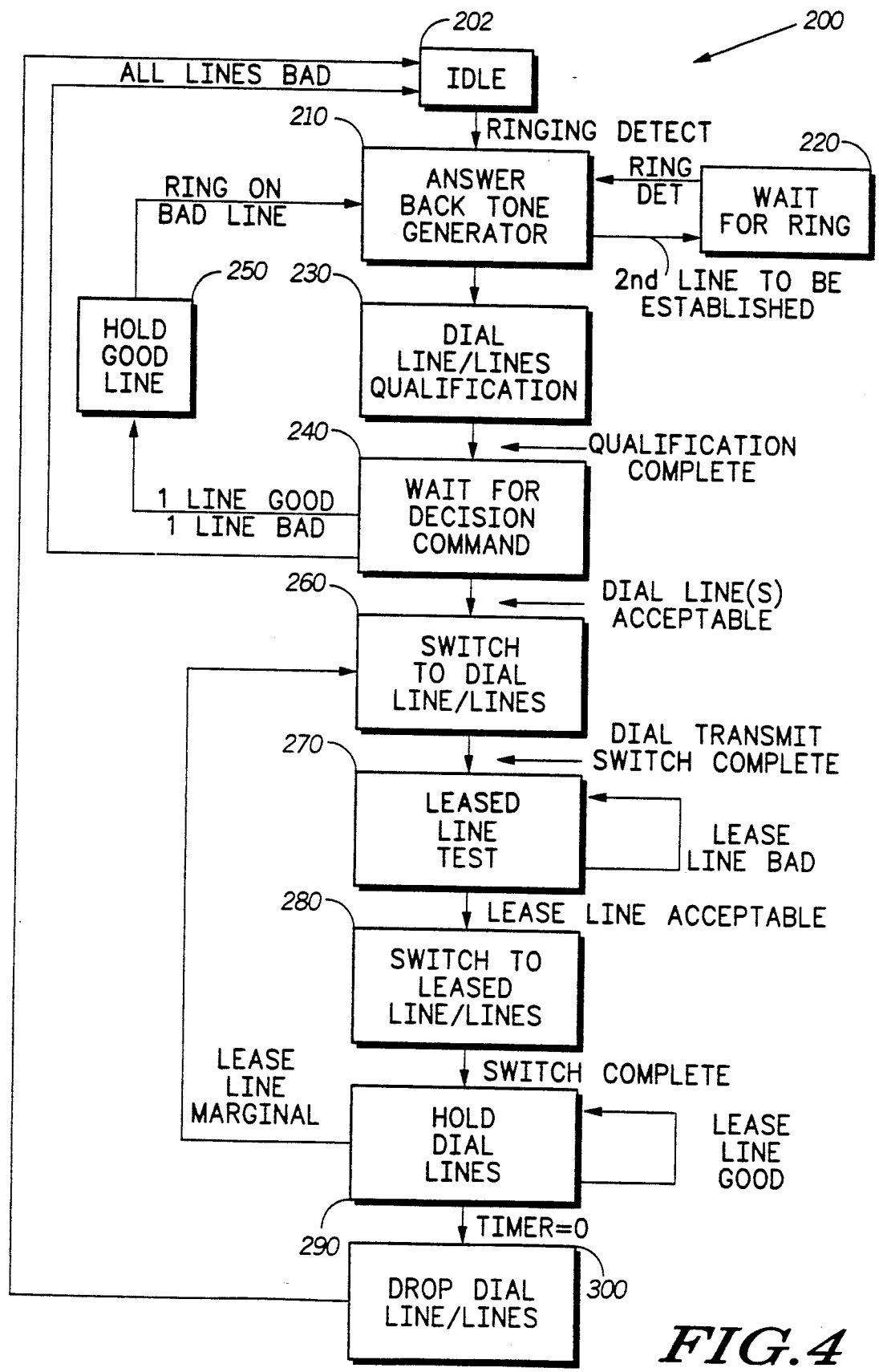
FIG. 4 is a flow chart of the restoral procedure implemented by the answering unit.

During a restoral backup, calling unit 2 implements a calling unit restoral protocol 100, as shown in FIG. 3, and concurrently answering unit 4 implements an answering unit restoral protocol 200, as shown in FIG. 4.

Referrring first to FIG. 3, before any restoral backup has been requested, restoral controller 66 in calling unit 2 is in an idle state waiting to receive a restoral backup request from CQMS 64 (step 102). Upon receiving a restoral backup request, restoral controller 66 accesses modulation mode data base 62 to determine whether a single or dual line modulation mode is to be operated on the dial line(s). In the case of dual line modulation modes, restoral controller 66 in calling unit 2 forces its restoral circuitry to switch its transmit and receive paths to the particular dial line selected by the user to be called first. In other words, I/O 46 causes multiplexers 40 and 42 to both select the same one of dial lines 36 or 38 for transmitting data to answering unit 4 and for receiving data from answering unit 4.

Then, restoral controller 66 instructs signal processor 30 to establish a dial connection to answering unit 4. The process of establishing a dial connection involves dialing a pre-stored phone number for a first dial line while monitoring call progress signals provided by the public switched telephone network (step 110) and then detecting an answer back tone from answer unit 4 indicating that the connection has been established (step 120). After signal processor 30 determines that the first dial line has been established, restoral controller 66 forces its restoral circuitry to switch its transmit and receive paths to the second dial line and then instructs signal processor 30 to establish a second dial connection to answering unit 4. Thus, the above-described steps 110 and 120 are repeated for the second dial line.

In the meantime, restoral controller 66 in the answering unit 4, which is capable of answering calls on either dial line in any order, is also in an idle state waiting to detect a ringing signal on any one of its dial lines (step 202). Upon detecting a ring signal on the first dial line, restoral controller 66 in answering unit 4 forces its restoral circuitry to switch its transmit path to that dial line and it then instructs its signal processor 30 to transmit answer back tone to calling unit 2 (step 210). After transmitting its answer back tone for a least three seconds, its restoral controller 66 will then wait for ringing to be detected on the second line (step 220). Upon detecting ring on the second dial line, restoral controller 66 in answering unit 4 forces its restoral circuitry to switch its transmit path to the second dial line and instructs its signal processor 30 to transmit an answer back tone to calling unit 2 for at least three seconds.

In the case of single line modulation modes, restoral controller 66 in calling unit 2 forces its restoral circuitry to switch its transmit and receive paths to dial line 36. Restoral controller 66 then instructs signal processor 30 to establish a dial connection to the answering unit 4. Upon detecting ring on the dial line, restoral controller 66 in answering unit 4 forces its restoral circuitry to switch its transmit path to that dial line and instructs its signal processor 30 to transmit an answer back tone to calling unit 2. After transmitting answer back tone for at least three seconds, its restoral controller 66 will not wait for ringing to be detected on the second line.

After the appropriate dial connection(s) have been established, calling unit 2 and answering unit 4 both determine whether the dial line (or lines) can support the bit rate selected by the user (step 130 in FIG. 3 and step 230 in FIG. 4). In the case of dual line modulation modes, restoral controller 66 in calling unit 2 and restoral controller 66 in answering unit 4 each forces its respective restoral circuitry to switch its transmit path to dial line 36 and its receive path to dial line 38. In the case of single line modulation modes, restoral controller 66 in calling unit 2 and restoral controller 66 in answering unit 4 both force their restoral circuitry to switch both their transmit and receive paths to dial line 36.

In both cases, after the transmit and receive paths have been switched, restoral controllers 66 in both calling unit 2 and answering unit 4 instruct their signal processors 30 to transmit and receive line probe signals. Analysis of the received line probe signals provides channel shaping and noise spectrum information. When restoral controller 66 instructs its signal processor 30 to transmit and receive line probing signals, imbedded in the process is the exchange of analysis data between calling and answering units 2 and 4. The exchange of data is done using a DPSK modulation scheme.

Details of the line probing process are fully described in U.S. patent application Ser. No. 351,199 filed by Ping Dong and Vedat Eyuboglu on May 12, 1989, and incorporated herein by reference.

In general, calling unit 2 includes a probing signal generator which generates a special probing signal sequence $x_1(n)$, and a line probing processor which measures the quality of channel A (i.e., the receive line). Likewise, answering unit 4 includes a corresponding probing signal generator, which generates a probing signal sequence $x_2(n)$, and a line probing processor which measures the quality of channel B (i.e., the transmit line). Both the probing signal generator and the line probing processor in each modem are implemented by signal processor 30 through software.

Calling unit 2 sends its probing signal sequence $x_1(n)$ to the line probing processor of answering unit 4, which uses the corresponding received signal to compute the signal-to-noise ratio (SNR) for channel A as a function of frequency, i.e., $SNR_A(f)$. Similarly, answering unit 4 sends probing sequence $x_2(n)$ to the line probing processor of calling unit 2, which uses the corresponding received signal to compute the signal-to-noise ratio (SNR) for channel B as a function of frequency, i.e., $SNR_B(f)$.

The probing sequences $x_1(n)$ and $x_2(n)$ are periodic signals selected to fully and uniformly stimulate the entire channel over the spectrum of frequencies which may be useful for data communication. One such sequence consists of a group of equal amplitude tones which are evenly spaced within the frequency band of interest, namely, 100 to 3600 Hz. It is desirable to select the phases of these tones so as to yield a relatively small peak-to-average ratio for the transmitted signal thereby reducing the possibility of driving the channel beyond its region of normal operation. The following is an example of one such probing sequence which satisfies these criteria:

$$x(n) = A \sum_{k_1}^{k_2} \cos(2\pi k f_\Delta n T_s + \theta_k), \quad n = 0, 1, \ldots, P - 1$$

$$\theta_k = \pi(k - k_1)^2/(k_2 - k_1)$$

where A is a scaling constant;
n is a sampling interval index;
$f_\alpha$ is the frequency resolution;
k is a frequency interval index;
$k_1$ specifies the lowest frequency index included in the sequence;

$k_2$ specifies the highest frequency index included in the sequence;
$T_s$ equals $1/f_s$ where $f_s$ is the sampling and
P equals $f_s/f_\Delta$, the number of samples in one period of the line probing signal.

In the embodiment described herein, the sampling rate is 9600 Hz, P equals 256, the frequency resolution $f_\Delta$ is 37.5 Hz, $k_1$ equals 3 and $k_2$ equals 96 (i.e., covering a frequency range from 112.5 to 3600 Hz).

The line probing processors employ the Fast Fourier Transform (FFT) technique to compute the SNR(f) for their respective channels. They determine SNR(f) by measuring the frequency response, H(f), and the noise power spectral density, $\Phi(f)$, of the channel at the discrete frequencies excited by the probing signal, i.e. $kf_\Delta$, where $k = k_1 \ldots k_2$. Then, the line probing processors compute the SNR(f) by using the following well-known relationship:

$$SNR(f) = |H(f)|^2/\Phi(f).$$

Line probing data is then derived from this measurement of SNR(f), and in the case of answering unit 4, that data is transmitted to calling unit 2.

When signal processor 30 in calling unit 2 indicates to its restoral controller 66 that it has completed line probing of the dial line(s), restoral controller 66 in calling unit 2 uses the line probing data from calling and answering units 2 and 4 to determine if the dial lines(s) can support the bit rate selected by the user (step 140).

In answering unit 4, when line probing is complete, restoral controller 66 waits for a command from calling unit 2 (step 240). Commands and responses sent between restoral controllers 66 in calling and answering units 2 and 4 use the same DPSK modulation scheme employed to exchange line probing data. All communication at this time between restoral controller 66 in calling and answering units 2 and is via the dial line(s).

In both calling and answering units 2 and 4, restoral controller 66 constructs all commands and responses to be transmitted and passes them to signal processor 30 as raw data to be transmitted. All commands and responses received by signal processor 30 are passed along to restoral controller 66. The integrity of all commands and responses is verified using a cyclical redundancy check.

If the dial line(s) cannot support the selected data rate, then the restoral controller in the calling unit sends a command to answering unit 4 instructing it to drop the dial line(s). Restoral controller 66 in calling unit 2 then forces its restoral circuitry to drop the dial line(s). When the restoral controller in the answering unit receives this command, it will force its restoral circuitry to drop the dial line(s). After restoral controller 66 in calling unit 2 has forced its restoral circuitry to drop the dial line(s), it proceeds to re-establish the dial connection(s), using the steps and procedures described earlier, in an attempt to obtain dial connection(s) which can support the selected bit rate (i.e., it repeats steps 110 through 140).

In the case of dual line modulation modes when one dial line can support the selected bit rate but the other cannot, restoral controller 66 in calling unit 2 sends a command to answering unit 4 instructing it to drop the "Bad" line and hold the "Good" line. Upon reception of this command, restoral controller 66 in the answerinq unit 4 sends a response to calling unit 2 acknowledging receipt of the command and then forces its restoral circuitry to drop the "Bad" line and instructs its signal processor 30 to transmit a continuous answer back tone on the "Good" line (step 250). As long as answering unit 4 is sending energy over the "Good" line, the public switched telephone network will not switch channels due to its being inactive. Such channel switching, if permitted to happen, could result in a deterioration of line quality.

Restoral controller 66 in calling unit 2, upon receiving the acknowledgment from answering unit 4, forces its restoral circuitry to drop the "Bad" line and then takes steps to re-establish the line. Once the "Bad" line is reestablished, the above-described dial line qualification procedures are repeated.

Upon determining that the dial line(s) can support the selected bit rate, calling unit 2 sends a command to answering unit 4 instructing it to switch its data transmission to the appropriate dial line(s). Upon receiving this command, restoral controller 66 in answering unit 4 sends a response to calling unit 2 acknowledging receipt of the command. After the acknowledgment has been sent, restoral controller 66 in answering unit 4 forces its restoral circuitry to switch the data transmission transmit and receive paths to the dial line(s) and the restoral circuitry's transmit and receive paths to the leased line(s) (step 260).

Upon receiving the acknowledgment from answering unit 4, restoral controller 66 in calling unit 2 also forces its restoral circuitry to perform the same switching as that just described for answering unit 4 (step 150). In the case of single line operation, however, prior to actual full duplex communication over the single line ranging and echo cancellation procedures must be invoked in order to train the echo cancellers (not shown) in both calling unit 2 and answering unit 4. If the selected modulation mode is defined by the industry standard V.32 protocol, then simply invoking that protocol takes care of these requirements.

After data transmission has been switched to the dial lines, restoral controllers 66 in both calling and answering units 2 and 4 access their respective modulation mode databases 62 to determine if the leased line modulation mode is a single or dual line modulation mod. In the case of dual line modulation modes, the restoral circuitry's transmit path is switched to transmit leased line 8 and the receive path is switched to receive leased line 10. In the case of single line modulation modes, both the transmit and receive paths are switched to leased line 8.

Once data transmission is occurring over the dial line(s), restoral controllers 66 in both calling and answering units 2 and 4 continuously probe the leased line(s) (step 160 in FIG. 3 and step 270 in FIG. 5). The line probing sequence employed for testing the leased line(s) is the same as that described earlier for qualifying the dial line(s).

All communication at this time between restoral controllers 66 in calling and answering units 2 and 4 is via the leased line(s). After each line probe sequence is complete, restoral controller 66 in calling unit 2 decides whether the leased line(s) are of sufficient quality to warrant termination of the restoral backup. When the leased line(s) are determined to be of sufficient quality, restoral controller 66 in calling unit 2 sends a command to answering unit 4 instructing it to switch data transmission back to the leased line(s).

Restoral controller 66 in answering unit 4 responds by sending an acknowledgment to calling unit 2 and forcing its restoral circuitry to switch the data transmission transmit and receive paths to leased line(s) and switch the restoral circuitry's transmit and receive paths to the dial line(s) (step 280). Upon receiving the acknowledgment from the answering unit, restoral controller 66 in calling unit 2 forces its restoral circuitry to perform the same switching (step 170).

After data transmission has been switched to the leased line(s), the particular PSTN channels used for dial line(s) are held by transmitting a DPSK carrier signal on the dial line(s) (steps 180 and 290). The dial line(s) are held for ten minutes. If during that time, restoral controller 66 in calling unit 2 determines that leased line(s) conditions warrant a restoral backup, then restoral controller 66 sends a command to answering unit 4 over the dial line(s) instructing it to switch its main channel back to the dial line(s). Restoral controller 66 in answering unit 4 responds by acknowledging this command and switching its main channel to the dial line(s) and its restoral circuitry to the leased line(s).

Upon receiving the acknowledgment from answering unit 4, restoral controller 66 in calling unit 2 performs the same switching. If after ten minutes, leased line(s) conditions do not warrant a restoral backup then restoral controllers 66 in both calling and answering units 2 and 4 force their respective restoral circuitry to drop the dial line(s) (step 190 in FIG. 3 and step 300 in FIG. 4).

Other embodiments are within the following claims.

What is claimed is:

1. A method for automatically switching data transmission paths between modems wherein quality of transmission occurring on a first path of one or more first lines has degraded, and transmission is to be switched to a second path of one or more second lines having an ability to transmit at a predetermined bit rate, comprising the steps of:
   monitoring the quality of transmission of the first lines;
   deciding whether the quality of transmission on one or more of the first lines is degraded such that it falls below a first standard;
   automatically establishing communication on the second lines if the quality of transmission of one or more of the first lines fails to meet the first standard;
   maintaining data transmission on said first lines while establishing communication on the second lines;
   a qualifying the second lines by determining whether the quality of transmission of the lines exceeds a second standard; and
   when the quality of transmission of the second lines exceeds the second standard, automatically switching data transmission from the first lines to the second lines wherein falling below the first standard comprises at least one of:
   (a) having loss of carrier; and
   (b) having a predetermined number of retrains/resynchronization;
and
wherein the second standard is a minimum bit rate that can reliably be supported based on an optimal symbol rate and carrier frequency determined by an analysis of a signal to noise spectrum over an entire transmission band.

2. The method of claim 1 wherein said first standard is a degree of degradation less than total loss of data transmission capability.

3. The method of claim 1 wherein communication is established on and data transmission is switched to a single second line.

4. The method of claim 1 wherein communication is established on and data transmission is switched to a plurality of second lines.

5. The method of claim 1 further comprising the steps of:
   after switching data transmission to the second lines, evaluating the quality of the first lines;
   if the quality of the first lines exceeds a third standard, automatically switching data transmission from the second lines back to the first lines.

6. The method of claim 1 wherein said switching step comprises using multiplexing circuitry.

7. The method of claim 1 wherein said monitoring, deciding, establishing communication, and switching steps comprise using a signal processor, associated memory circuitry, and analog circuitry for interfacing the signal processor to said lines.

8. The method of claim 1 wherein control over said steps is maintained by a first of said modems (e.g., the calling modem) and said first modem communicates commands to a second of said modems (e.g., the answering modem).

9. The method of claim 8 further comprising the step of transmitting commands from said first modem to said second modem across one or more of said first or second lines.

10. The method of claim 8, wherein one of said commands instructs said second modem to switch the lines used for data transmission.

11. The method of claim 2 wherein said first standard comprises determining whether the number of synchronization sequences transmitted over a predetermined period of time exceeds a threshold.

12. The method of claim 11 further comprising the step of adjusting said first standard to change the level of degradation that will invoke switching data transmission to said second lines.

13. A method for automatically switching data transmission paths between modems, wherein quality of transmission occurring on a first path of one or more first lines has degraded, and transmission is to be switched to a second path of one or more second lines having an ability to transmit at a predetermined bit rate, comprising the steps of:
   monitoring the quality of transmission of the first lines,
   when the quality of transmission of the first lines falls below a first standard, automatically establishing communication on the second lines wherein said second lines are dial lines and wherein data transmission is maintained on said first lines while establishing communication on the second lines;
   qualifying the second lines by determining whether the quality of transmission of the lines exceeds a second standard;
   when the quality of transmission of the second lines exceeds the second standard, automatically switching data transmission to the second lines; and
   maintaining energy on one or more said dial lines in the absence of data transmission to prevent a change of channel on those dial lines wherein falling below the first standard comprises at least one of:
   (a) having loss of carrier; and
   (b) having a predetermined number of retrains/resynchronization;
   and
   wherein the second standard is a minimum bit rate that can reliably be supported based on an optimal symbol rate and carrier frequency determined by an analysis of a signal to noise spectrum over an entire transmission band,
   further comprising the steps of dropping a second lines that fails to meet said second standard and establishing communication and determining quality of transmission for a new second line while maintaining energy on on the line(s) in absence of transmission on the line(s).

14. The method of claim 13 wherein the step of determining whether the quality of the second lines exceeds a second standard comprises the step of measuring the signal to noise ratio of said second lines.

15. A method for automatically switching data transmission paths between modems, wherein, upon monitoring a quality of transmission occurring on a first path of one or more first lines and determining that said quality has degraded below a first standard, maintaining data transmission on said first lines while automatically establishing communication on a second path of one or more second lines, and automatically switching transmission to the second path of one or more second lines having an ability to transmit at a predetermined bit rate, i.e., wherein a quality of transmission of said second line(s) exceeds a second standard, the method comprising the steps of:
   after switching data transmission to the second lines, wherein the second lines are dial lines, automatically evaluating the quality of transmission of the first lines;
   if the quality of transmission of the first lines exceeds a third standard, automatically stitching data transmission from the second lines back to the first lines wherein being degraded below the first standard comprises at least one of:
   (a) having loss of carrier; and
   (b) having a predetermined number of retrains/resynchronization;
   and
   wherein the second/third standard is a minimum bit rate that can reliably be supported based on an optimal symbol rate and carrier frequency determined by an analysis of a signal to noise spectrum over an entire transmission band.

16. The method of claim 5 or 15 wherein said evaluating of the quality of the first lines comprises repeatedly performing calibration of the first lines.

17. The method of claim 1, 13, or 15 wherein the first lines are one or more leased telephone lines.

18. The method of claim 1, 13, or 15 wherein he second lines are one or more dial lines.

19. The method of claim 5 or 15 wherein said third standard is the same as said first standard.

20. A system for automatically switching data transmission paths between modems, wherein quality of transmission occurring on a first path of one or more first lines has degraded below a first standard, and transmission is to be automatically switched to a second path of one or more second lines having an ability to transmit at a predetermined bit rate, the system comprising:
   means for monitoring the quality of transmission of the e first lines;
   means for deciding whether the quality of transmission of the first lines falls below a first standard;

means for automatically establishing communication on the second lines if the quality of transmission of the first lines fails to meet the first standard;

means for maintaining data transmission on said first lines while establishing communication on the second lines;

means for qualifying the second lines, prior to switching data transmission to the second lines, by determining whether the quality of transmission of the lines exceeds a second standard; and means for switching data transmission from the first lines to the second lines when the quality of transmission of said second line(s) exceeds a second standard wherein falling below the first standard comprises at least one of;

(a) having loss of carrier; and
(b) having a predetermined number of retrains/resynchronization;

and wherein the second standard is a minimum bit rate that can reliably be supported based on an optimal symbol rate and carrier frequency determined by an analysis of a signal to noise spectrum over an entire transmission band.

21. The system of claim 20 wherein said first standard is a degree of degradation less than total loss of data transmission capability.

22. The system of claim 20 wherein communication is established on and data transmission is switched to a signal second line.

23. The system of claim 20 wherein communication is established on and data transmission is switched to a plurality of second lines.

24. The system of claim 20 further comprising:
means for evaluating the quality of the first lines after switching data transmission to the second lines;
means for automatically switching data transmission from the second lines back to the first lines if the quality of the first lines exceeds a third standard.

25. The system of claim 20 wherein said means or switching comprises multiplexing circuitry.

26. The system of claim 20 wherein said means for monitoring, means for deciding, means or establishing communication, and means for switching comprise a signal processor, associated memory circuitry, and analog circuitry for interfacing the signal processor to said lines.

27. The system of claim 20 comprising means for providing at control of said establishing communication and switching functions is maintained by a first of said modems (e.g., the calling modem) and mans in said first modem for communicating commands to a second of said modems (e.g., the answering modem).

28. The system of claim 27 further comprising means for transmitting commands from said first modem to said second modem across one or more of said first or second lines.

29. The system of claim 27 wherein one of said commands instructs said second modem to switch the lines used for data transmission.

30. The system of claim 21 wherein said first standard comprises determining whether the number of synchronization sequences transmitted over a predetermined period of time exceeds a threshold.

31. The system of claim 30 further comprising means for adjusting said first standard to change the level of degradation that will invoke switching data transmission to said second lines.

32. A system for automatically switching data transmission paths between modems, wherein, upon monitoring a quality of transmission occurring on a first path of one or more first lines and determining that said quality has degraded below a first standard, and switching transmission to a second path of one or more second lines having an ability to transmit at a predetermined bit rate, i.e., wherein a quality of said second line(s) exceeds a second standard, comprising:

means for automatically establishing communication on the second lines wherein the second lines are dial lines and maintaining data transmission on said first lines while establishing communication on a second path of one or more second lines;

means for qualifying the second lines by determining whether the quality of transmission of the lines exceeds a second standard;

means for, when the quality of transmission of the second lines exceeds the second standard, automatically switching data transmission to the second lines; and means for maintaining energy on one or more said dial lines in the absence of data transmission to prevent a change of channel on those dial lines wherein being degraded below the first standard comprises at least one of:

(a) having loss of carrier; and
(b) having a predetermined number of retrains/resynchronization;

and wherein the second standard is a minimum bit rate that can reliably be supported based on an optimal symbol rate and carrier frequency determined by an analysis of a signal to noise spectrum over an entire transmission band, further comprising means of dropping a second line that fails to met said second standard and means for establishing communication and determining quality of transmission for a new second line while maintaining energy on the line(s) in absence of transmission on the line(s).

33. The system of claim 32 wherein said means for determining whether the quality of the second lines exceeds a second standard comprises means or measuring the signal to noise ratio of said second lines.

34. In a system for automatically switching data transmission paths between modems, wherein, upon monitoring a quality of transmission occurring on a first path of one or more first lines and determining that said quality has degraded below a first standard and wherein data transmission is maintained on said first lines while automatically establishing communication on a second path of one or more second lines, and automatically switching transmission to the second path of one or more second lines, said second lines having an ability to transmit at a predetermined bit rate, i.e., wherein a quality of transmission of said second line(s) exceeds a second standard, the system comprising:

means for automatically evaluating the quality of transmission of the first lines after switching data transmission of the second lines wherein said second lines are dial lines;

means for automatically switching data transmission from the second lines back to the first lines if the quality of transmission of the first lines exceeds a third standard; and mean for applying energy to one or more of said dual lines, to prevent a change of channel on said dial lines, for a period of time following switching back to the first lines means remonitoring the quality of first lines during that period; and means for against switching data transmission to the dial lines if the quality of the first lines falls below said first standard wherein being degraded below the first standard comprises at least one of;
(a) having loss of carrier; and
(b) having a predetermined number of retrains/resynchronization;
and wherein the second/third standard is a minimum bit rate that can reliably e supported based on an optimal symbol rate and carrier frequency determined by an analysis of a signal to noise spectrum over an entire transmission band.

35. The system of claim 24 or 34 wherein said means for evaluating the quality of the first lines comprises means for repeatedly performing calibration of the first lines.

36. The system of claim 20, 32, or 34 wherein the first lines re one or more leased telephone lines.

37. The system of claim 20, 32, or 34 wherein the second lines are one or more dial lines.

38. The system of claim 24 or 34 wherein said third standard is the same as said first standard.

* * * * *

UNITED STATES PATENT AND TRADEMARK OFFICE
CERTIFICATE OF CORRECTION

PATENT NO. : 5,274,697

DATED : Dec. 28, 1993

INVENTOR(S) : Stephen Schroeder and Manickam R. Sridhar

It is certified that error appears in the above-identified patent and that said Letters Patent is hereby corrected as shown below:

In the claims:
At column 8, line 32, "between modems wherein" should be --between modems, wherein--.
At column 8, line 49, "a qualifying the" should be --qualifying the--.
At column 8, line 59, "resynchronization;" should be --resynchronizations;--
At column 9, line 56, "lines" should be --line--.
At column 10, line 9, "lines" should be --line--.
At column 10, line 54, "he" should be --the--.
At column 10, line 66, "the e first" should be --the first--.
At column 11, line 30, "signal" should be --single--.
At column 11, line 40, "or" should be --for--.
At column 11, line 43, "or" should be --for--.
At column 11, line 49, "at" should be --that--.
At column 11, line 51, "mans" should be --means--.
At column 12, line 37, "met" should be --meet--.
At column 12, line 61, "of the second" should be --to the second--.
At column 12, line 67, "dual" should be --dial--.
At column 13, line 2, "lines" should be --lines;--.
At column 13, line 3, "means remonitoring" should be --means for monitoring--.
At column 13, line 5, "for against" should be --for again--.
At column 13, line 14, "reliably e" should be --reliably be--.

UNITED STATES PATENT AND TRADEMARK OFFICE
CERTIFICATE OF CORRECTION

PATENT NO. : 5,274,697
DATED : Dec. 28, 1993
INVENTOR(S) : Stephen Schroeder and Manickam R. Sridhar It is certified that error appears in the above-indentified patent and that said Letters Patent is hereby corrected as shown below:

Column 14, line 9, "lines re" should read --lines are--.

Signed and Sealed this

Fifth Day of July, 1994

Attest:

BRUCE LEHMAN

Attesting Officer

Commissioner of Patents and Trademarks